United States Patent [19]

Fujibayashi

[11] Patent Number: 5,515,121
[45] Date of Patent: May 7, 1996

[54] IMAGE PROJECTING APPARATUS

[75] Inventor: Kazuo Fujibayashi, Kawasaki, Japan

[73] Assignee: Canon Kabushiki Kaisha, Tokyo, Japan

[21] Appl. No.: 439,108

[22] Filed: May 11, 1995

[30] Foreign Application Priority Data

May 13, 1994 [JP] Japan .................................. 6-124531

[51] Int. Cl.⁶ ................................................ G03B 21/28
[52] U.S. Cl. ...................... 353/081; 353/26 A; 355/045
[58] Field of Search ............................. 353/81, 25, 26 A, 353/27 A, 26 R, 82; 355/41, 43, 55, 57, 60, 66, 45

[56] References Cited

U.S. PATENT DOCUMENTS

| | | | |
|---|---|---|---|
| 4,436,391 | 3/1984 | Kashiwagi | 353/81 |
| 4,695,155 | 9/1987 | Ishii et al. | 355/45 |
| 4,825,243 | 4/1989 | Ito et al. | 353/26 A |
| 4,855,789 | 8/1989 | Ogawa | 353/81 |
| 4,952,052 | 8/1990 | Ueda et al. | 353/27 R |

FOREIGN PATENT DOCUMENTS 63-70812   3/1988   Japan .
63-316838  12/1988  Japan .

*Primary Examiner*—William C. Dowling
*Attorney, Agent, or Firm*—Fitzpatrick, Cella, Harper & Scinto

[57] ABSTRACT

In an apparatus for projecting an image by a projection lens onto a projection surface such as a screen surface or a surface of a recording medium, a prism for rotating the projection image is disposed on the exit side of the projection lens so that the entrance-side optical axis of the prism deviates from the exit-side optical axis thereof. An image-forming lens and a focal point detecting unit for detecting a focus state of the projection lens on the projection surface are disposed on a reflection side of a half mirror. When the focal point detecting unit detects the focus state of the projection lens, an adjusting unit effects a relative rotation between the prism and the image-forming lens and focal point detecting unit so as to make the exit-side optical axis of the prism coincide with the optical axis of the image-forming lens.

13 Claims, 3 Drawing Sheets

IMAGE PROJECTING APPARATUS

BACKGROUND OF THE INVENTION

1. Field of the Invention

The present invention relates to an image projecting apparatus having focal-point detecting means, and more particularly to an image projecting apparatus having focal-point detecting means, for example, suitable for an apparatus such as a microfilm reader or a microfilm reader-printer. The apparatus is arranged to detect an image-forming state of a projection image projected onto a screen surface or onto a surface of a recording medium through a projection lens, thereby obtaining an excellent projection image always in focus.

2. Related Background Art

Ordinary image projecting apparatuses such as microfilm reader-printers have a reader portion (observing system) for magnification-projecting an image (image information) of a document onto microfilm or the like, in which demagnified images of documents are recorded onto the screen surface through the projection lens. A printer portion (recording system) is also for projecting the image of the document on a photosensitive member through the projection lens to output a copy thereof.

In many microfilm reader-printers an operator manually moves the projection lens along the optical axis thereof to obtain an in-focus projection image on the screen surface or the surface of photosensitive member.

Because of such an operation, focus adjustment is troublesome, a recent demand is to achieve a reader-printer that can be automatically focused within a short time using focal-point detecting means.

Generally, when a projection magnification is as high as 40 to 50 for the projection lens in the image projecting apparatus, the depth of focus becomes as shallow as 0.02 mm. Thus, the focal-point detecting means is required to have high optical accuracy in order to form a sharp projection image on the screen surface or the surface of photosensitive drum.

A variety of image projection apparatus using the focal-point detecting means are proposed, for example, in Japanese Laid-Open Patent Application No. 63-316838 and No. 63-70812.

In the Japanese Laid-Open Patent Application No. 63-316838, there is provided a reader system optical path for projecting a magnified image and a focus detection optical path for guiding a light beam to a light-receiving element for focus detection. A secondary image-forming lens is disposed in the focus detection optical path to demagnify the projection image of the projection lens to form a demagnified image thereof on the light-receiving element. Then focus adjustment is performed based on a signal obtained from the light-receiving element.

In Japanese Laid-Open Patent Application No. 63-70812, an image sensor is provided for reading a projection image, wherein contrast signals concerning the projection image are obtained in a plurality of regions in the image sensor, and an in-focus position for each region is obtained at a position on the optical axis of projection lens where each contrast signal becomes maximum. Then focus adjustment is made by determining the in-focus position of the projection lens using a set of in-focus positions most frequently appearing among the in-focus positions of the respective regions and located close to each other.

Many of recent microfilm reader-printers are equipped with a rotation prism of a trapezoid cross section on the exit side of a taking lens. An in-plane angle of the projection image on the screen surface or the surface of photosensitive drum is adjusted by rotating the rotation prism with the optical axis thereof as a rotation axis.

Since the rotation prism requires an effective size for sufficiently transmitting the projection light beam from the projection lens, it was apt to become relatively larger in scale. Thus, the conventional apparatus employs such an arrangement that an incident point 8a of the projection optical axis 7a into the rotation prism 8 is shifted relative to an emergent point 8b therefrom as shown in FIG. 2. That is, the two optical axes deviate from each other, thereby decreasing the size of the rotation prism.

In FIG. 2, reference numeral 6 designates an image of a document on a microfilm or the like, 7 refers to the projection lens, and 11 designates the screen surface. Further, Δh represents an amount of deviation between the entrance-side optical axis and the exit-side optical axis of the rotation prism 8.

In the structure of the deviating optical axes of the rotation prism, however, when the entrance-side optical axis of the rotation prism rotates around the optical axis the position of the exit-side optical axis changes as a circle with the deviation amount Δh as a radius on the exit side of the rotation prism.

This causes such a problem that, for example, where a fixed focal-point detecting system is set on the exit side of rotation prism, an incident light beam into the focal-point detecting system changes with rotation of the rotation prism, spoiling the focus detection condition.

SUMMARY OF THE INVENTION

An object of the present invention is to provide an image projecting apparatus having focal-point detecting means capable of performing excellent focal point detection by suitably arranging the rotation prism and the focal-point detecting means, where the rotation prism is used to adjust an in-plane angle of a projection image projected on a projection surface and a light beam passing through the rotation prism is used to detect the focal point of projection lens.

An image projecting apparatus of the present invention is an apparatus for projecting an image onto a projection surface such as a screen surface or a surface of a recording medium by a projection lens, which comprises a prism disposed on an exit side of the projection lens so that an entrance-side optical axis of the prism for rotating the projection image deviates from an exit-side optical axis thereof, a half mirror disposed on an exit side of the prism, for reflecting part of an incident light beam, a focal-point detecting unit disposed on a reflection side of the half mirror, for detecting a focus state on the projection surface by the projection lens, and means for effecting a relative rotation between the prism and the focal-point detecting unit so that the exit-side optical axis of the prism is located at a predetermined position of the focal-point detecting unit.

Specifically, with a rotation operation of the prism, the half mirror, image-forming lens, and the focal-point detecting unit are displaced as a whole to a position corresponding to a rotation angle of the rotation prism. In other words with input of an operation start signal to the focal-point detecting unit, the prism is rotated so as to make the exit-side optical axis thereof coincident with the optical axis of the image-forming lens, and returns it to the original position after completion of the operation of the focal-point detecting unit.

DESCRIPTION OF THE PREFERRED EMBODIMENTS

Figure 1:
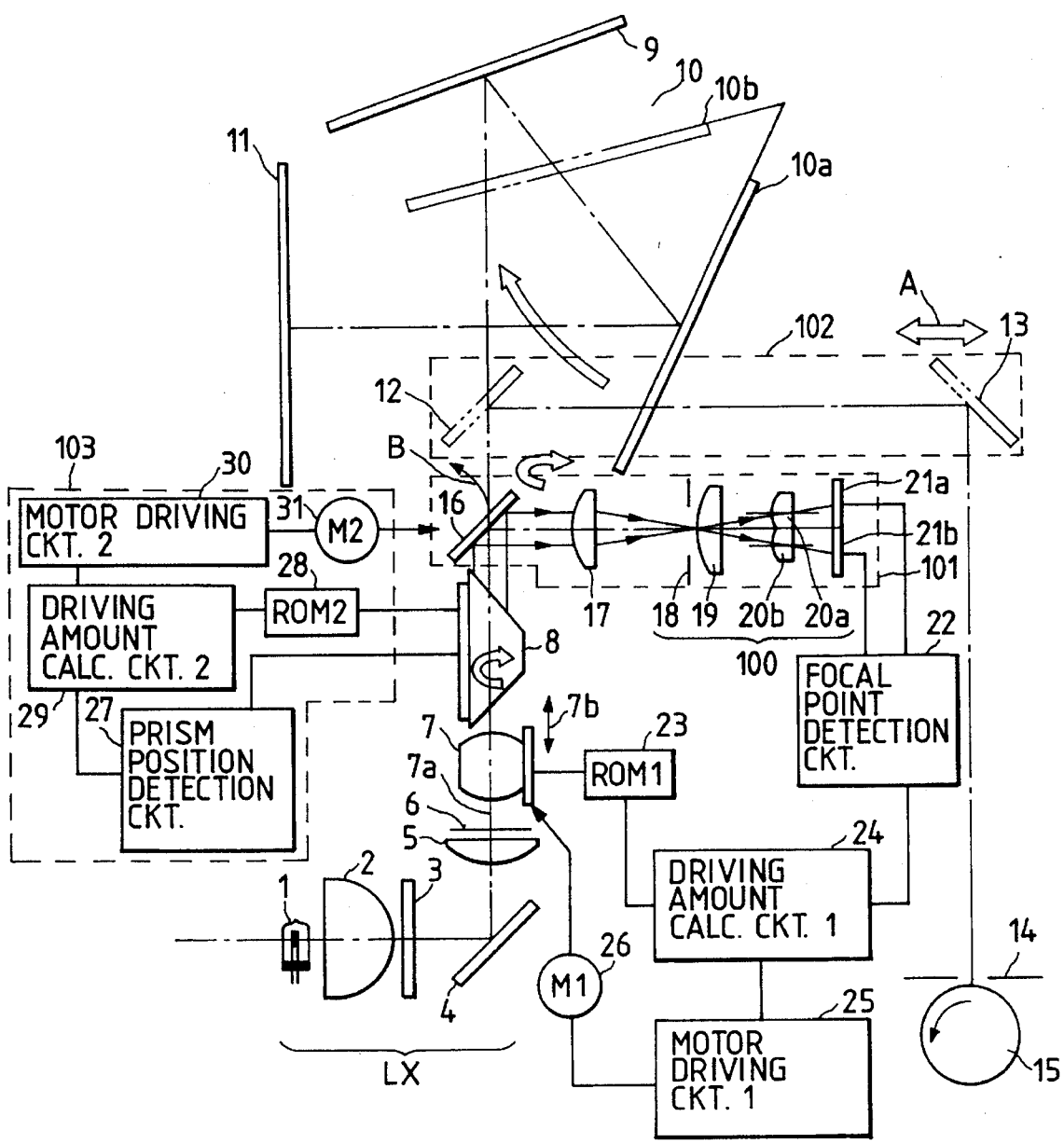
FIG. 1 is a schematic drawing of major part of Embodiment 1 of the present invention.
Figure 2:
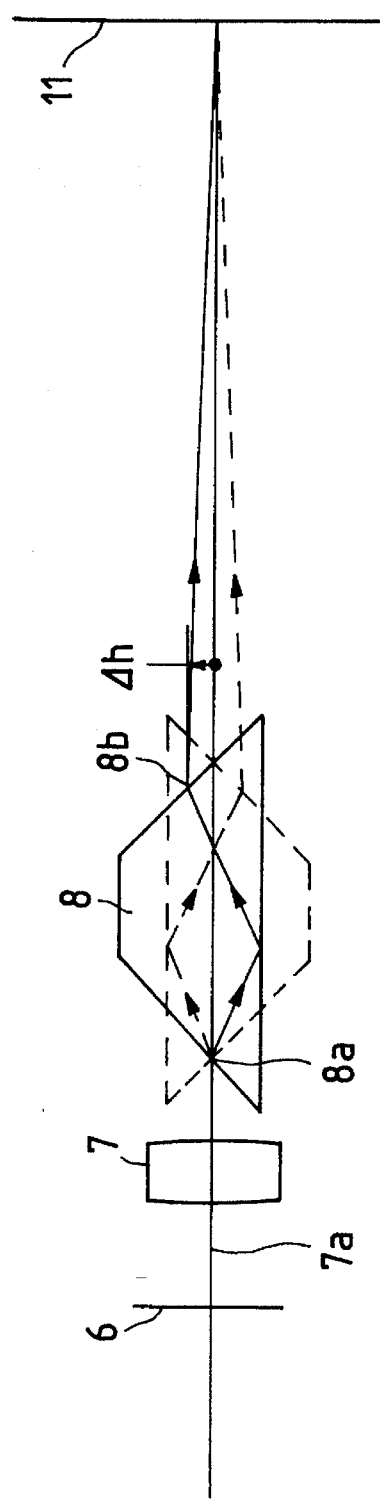
FIG. 2 is a diagrammatic drawing to show a development of an optical path in a part of FIG. 1.
Figure 3:
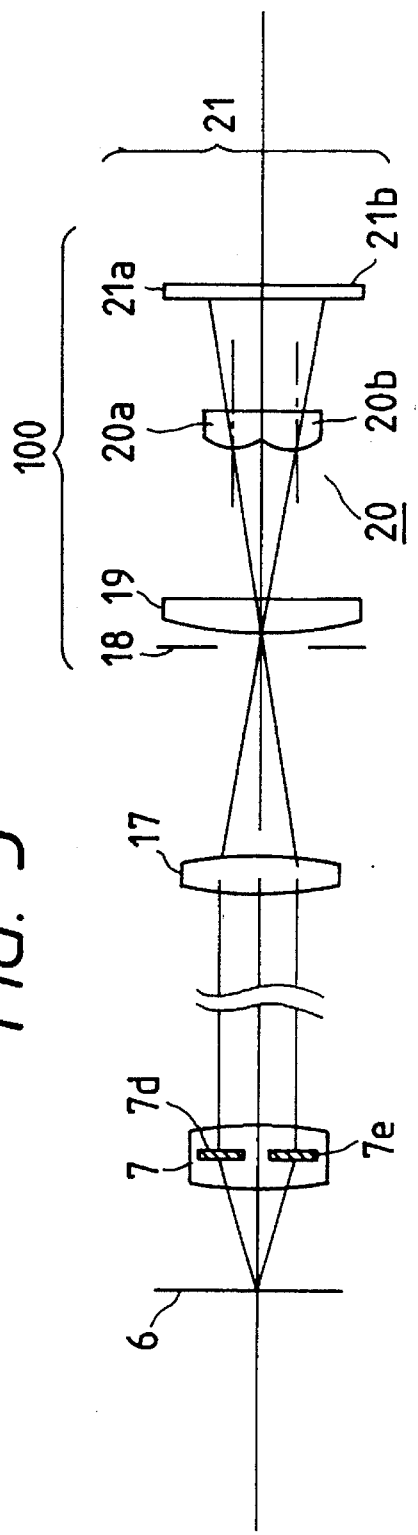
FIG. 3 is a diagrammatic drawing to show a development of an optical path in a part of FIG. 1.
Figure 4:
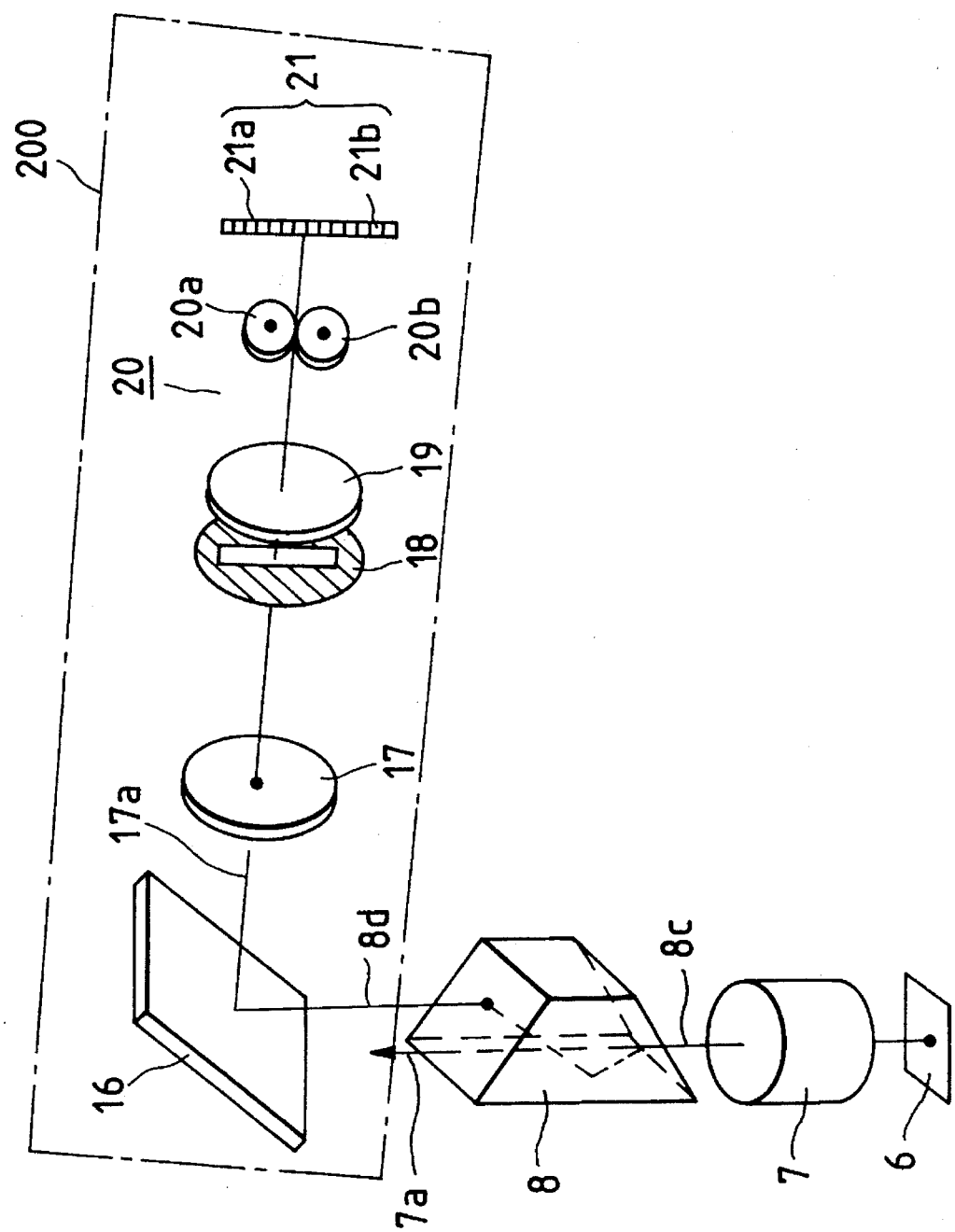
FIG. 4 is an enlarged perspective view of a part of FIG. 1.

FIG. 1 is a schematic drawing of major part of an optical system in the first embodiment of the present invention. FIG. 3 is an explanatory view showing an optical path in a part of FIG. 1, and FIG. 4 is a perspective view of a part of FIG. 1.

In the drawings, reference numeral 1 designates a light source for illuminating a document, which consists, for example, of a halogen lamp or a fluorescent tube. Numeral 2 denotes a condenser lens, which condenses a light beam from the light source means 1. Numeral 3 is a heat insulating glass, and 4 a cold mirror. The optical members 3, 4 remove infrared light components out of the light beam emitted from the light source means 1 to suppress an increase of temperature on a surface of a document image 6. Numeral 5 denotes a field lens. In the present embodiment the elements with the reference numerals 1, 2, 3, 4, 5 constitute an illuminating means (illumination optical system) LX.

Numeral 6 represents a transmission-type document image (image information), which is, for example, a microfilm etc. Numeral 7 denotes a projection lens, which magnification-projects the document image 6 onto a surface of screen 11.

The projection lens 7 is controlled as indicated by the arrow 7b on the optical axis 7a by a driving means 26, based on a signal (output value) obtained by a focal-point detecting means 101 as detailed later, thereby effecting focus adjustment (focusing) of the projection image on the surface of screen 11.

Numeral 8 is a rotation prism, which is disposed on the exit surface side of the projection lens 7 so that an incident point 8a of light beam deviates from an emergent point 8b. That is, the entrance-side optical axis 8c deviates from the exit-side optical axis 8d, as shown in FIG. 4. The optical axis 7a of the projection lens 7 is coincident with the entrance-side optical axis 8c of the rotation prism 8. The rotation prism 8 is arranged so as to be rotatable with the optical axis 8c or the optical axis 7a of the projection lens 7 as a rotation axis.

Numeral 16 denotes a beam splitting means for splitting a projection optical path of image into a first optical path and a second optical path. The beam spliting means is a half mirror disposed in the exit-side optical path of the rotation prism 8 between the rotation prism 8 and the surface of screen 11 and separates a part of the light beam coming from the rotation prism 8. The first optical path is formed on the transmission side of half mirror 16 while the second optical path on the reflection side, and the screen 11 or photosensitive drum 15 is located on a first projection surface in the first optical path.

Numeral 17 designates an image-forming lens (demagnifying lens) for focus detection. The optical axis 17a of image-forming lens 17 is set so as to coincide with the exit-side optical axis 8d of rotation prism 8, as shown in FIG. 1 and FIG. 4.

Numeral 18 denotes a mask for focus detection, which limits a quantity of light incident on line sensor 21. Numeral 19 is a field lens for focus detection, which has an optical function guiding a projection image formed by the image-forming lens 17 through re-imaging lenses 20a, 20b to the surface of line sensor 21. Each of 20a, 20b denotes a re-imaging lens, and are located in symmetry with respect to the optical axis. Numeral 21 represents a light-receiving element for focus detection, which consists of a line sensor (CCD). The light-receiving element 21 is located on a second projection surface in the second optical path formed on the reflection side of half mirror 16.

In the present embodiment the elements with reference numerals 18, 19, 20a, 20b, 21 constitute a focal-point detecting unit; the half mirror 16, image-forming lens 17, and focal-point detecting unit 100 constitute the focal-point detecting means 101. A focal-point detecting method of the present embodiment employs the so-called image deviation method which is well known.

The components of the focal-point detecting means 101 are set in an outer case 200 (FIG. 4). A circular gear is fixed to the outer periphery of the outer case 200, and the outer case 200 rotates when this gear is rotated by a drive motor. The rotation axis of the outer case 200 is arranged to coincide with the rotation axis 7a of the prism 8 on the half mirror 16. Namely, there is a deviation of Δh between the rotation axis of the outer case 200 and the optical axis 17a of the image-forming lens 17 in the outer case 200. Accordingly, the exit-side optical axis 8d of prism 8 can be made coincident with the optical axis 17a of the image-forming lens 17 on the half mirror 16 by rotating either one of the outer case 200 and the prism 8 about the rotation axis.

FIG. 3 is a diagrammatic view of the optical system to show a developed optical path of the optical system for detection of focal point of the projection lens 7.

In FIG. 3, pupils 7d, 7e of the projection lens 7 are imaged at a pair of re-imaging lenses 20a, 20b. Thus, if the prism 8 rotates while the focal-point detecting unit 100 is fixed, the image-forming relation of the pupils is destroyed. Namely, focal point detection becomes impossible because the light beam never reaches the re-imaging lenses 20a, 20b. Since the present invention makes the focal-point detecting means 101 rotate in accordance with a rotation position of the prism, the images of the pupils 7d, 7e of the projection lens 7 can be always formed at the re-imaging lenses, thus making detection of focal point always possible.

In FIG. 1, numeral 22 denotes a focal point detection circuit, which detects a focus state of the projection lens 7 utilizing an output signal from the line sensor 21.

Numeral 24 is a driving amount calculating circuit, which calculates a driving amount of the projection lens 7 on the optical axis, utilizing the output signal of the focal point detection circuit 22 and data from ROM 23 which stores magnification information of the projection lens 7. Numeral 25 is a driving circuit for moving the projection lens 7 on the optical axis through a driving motor 26, based on a signal from the driving amount calculating circuit 24.

Numeral 27 represents a prism position detection circuit, which detects information of rotational position of the rotation prism 8. Numeral 28 indicates ROM, which stores the rotational position information of the rotation prism 8.

Numeral 29 designates a driving amount calculating circuit, which calculates an amount of rotation of the focal point detecting means 101 in accordance with a rotation amount of the rotation prism 8. Numeral 30 denotes a driving circuit, which rotates the focal point detecting means 101 through a driving motor 31, based on a signal from the driving amount calculating circuit 29, about the rotation axis 7a after being bent by the half mirror 16. Each element 27, 28, 29, 30, 31 constitutes an element in an adjusting means 103.

Numeral 102 denotes a movable scan portion for printing, which has a scanning mirror 12 and a reflective mirror 13 and which moves into the optical path of projection lens 7 upon printing as indicated by the arrow A in FIG. 1, but recedes out of the optical path upon reading. Numeral 14 is a slit for printing, which limits a quantity of light to a surface of photosensitive drum 15. Numeral 15 is a photosensitive drum as a recording medium. Numeral 9 denotes a reflective mirror for the reader, and 10 a rotating mirror for the reader, which is rotatable to a position 10a upon reading and to a position 10b upon printing.

In the present embodiment, a light beam emitted from the light source means 1 is condensed by the condenser lens 2, is guided through the heat insulating glass 3, is reflected by the cold mirror 4, and thereafter illuminates an effective illumination area of the document image 6 through the field lens 5. Then the light beam based on the image 6, having passed through the projection lens 7, passes through the rotation prism 8, and thereafter is split by the half mirror 16 into two light beams traveling in two directions, one of which travels toward the surface of screen 11 (or the surface of photosensitive drum 15) and the other toward the focal point detecting means 101.

In the present embodiment the elements are set so that the light beam from the light source means 1 is converged (or focused) in the vicinity of the position of the entrance pupil of the projection lens 7, so as to effect the Köhler illumination.

In case of the reader, for observing the document image 6 on the surface of screen 11, the light beam passing through the half mirror 16 is guided to the surface of screen 11 via the reflective mirror 9 and the rotating mirror 10, and an enlarged projection image is formed on the screen surface.

In case of the printer, for forming the projection image on the surface of photosensitive drum 15, the scan portion 102 for the printer moves as indicated by the arrow A in the drawing so as to be located in the optical path, whereby it guides the light beam passing through the half mirror 16 so as to be reflected by the scanning mirror 12 and reflective mirror 13 and then to be incident upon the surface of the photosensitive drum 15. Thus, an enlarged projection image is formed on the surface of photosensitive drum 15.

In this scenario, the scanning mirror 12 and reflective mirror 13 are moved together for the light beam to scan the surface of the photosensitive drum 15 in the sub-scan direction, whereby image information of the entire document image 6 is projected on the surface of photosensitive drum 15.

On the other hand, the light beam based on the projection image reflected by the half mirror 16 is focused on the mask 18 (intended image plane) by the image-forming lens 17, and the projection image thus focused is guided through the field lens 19 and then is projected onto the surface of line sensor 21 by the re-imaging lenses 20a, 20b.

Namely, the projection image formed in the vicinity of mask 18 is re-imaged as two projection images on the surface of line sensor 21 by the re-imaging lenses 20a, 20b. Then the focus state of the projection lens 7 is detected by obtaining the distance between the two projection images by the focal point detecting circuit 22.

Then using the signal from the focal point detecting circuit 22 and data from ROM 23 storing magnification image etc. of the projection lens 7, the driving amount calculating circuit 24 calculates the driving amount of the projection lens 7 on the optical axis. Then, based on the signal from the driving amount calculating circuit 24, the driving circuit 25 moves the projection lens 7 on the optical axis through the driving motor 26.

As described, the present embodiment is so arranged that the driving amount of the projection lens 7 is preliminarily obtained by the driving amount calculating circuit 24 and that focus adjustment is completed not by moving the projection lens 7 on the optical axis several times, but by single movement thereof. By this arrangement, focus adjustment can be done without any troublesome operation of observer.

In the present embodiment, after completion of focus adjustment, the half mirror 16 which serves as beam splitting means may be rotated as indicated by the arrow B in the drawing so as to be located off the optical path. The arrangement can avoid a decrease in illuminance on the surface of screen 11 and a decrease in exposure amount on the surface of photosensitive drum 15.

In the present embodiment, the entrance-side optical axis (incident point) 8c of the rotation prism 8 deviates by $\Delta h$ from the exit-side optical axis (emergent point) 8d. On the surface of screen 11 the emergent optical axis is slightly inclined so as to be located on an extension line of the original optical axis.

This prevents the center of projection image from moving on the screen surface when the rotation prism 8 is rotated about the rotation axis of the optical axis 7a. On the other hand, when the rotation prism 8 is rotated, the exit-side optical axis 8d thereof becomes deviating from the optical axis 17a of the focal point detecting means 101.

Thus, the present embodiment is arranged to detect a rotation amount of the rotation prism 8 by the prism position detecting circuit 27. Then the driving amount calculating circuit 29 calculates a rotation amount of the focal point detecting means 101, based on a signal from the prism position detecting circuit 27, and outputs it to the driving circuit 30. This can rotate the focal point detecting means 101 independently of the rotation of prism 8.

The driving circuit 30 drives the driving motor 31, based on a signal from the driving amount calculating circuit 29, to rotate the focal point detecting means 101 about the rotation axis of the optical axis 7a after being bent by the half mirror 16. Then the exit-side optical axis 8d of the rotation prism 8 is made coincident with the optical axis 17a of the image-forming lens 17 in the focal point detecting means 101, thereby completing excellent focus detection.

The present invention may include such an arrangement that the focal point detecting means 101 is arranged as stationary, the adjusting means 103 rotates the rotation prism 8 about the optical axis 7a with input of an operation signal into the focal point detecting unit so as to make the exit-side optical axis 8d of the rotation prism 8 coincident on the half mirror 16 with the optical axis 17a of the image-forming lens 17, and the prism 8 is returned to the original position after completion of focus detection. This arrangement has a feature that the mechanism can be simplified.

As described above, the present invention can achieve the image projecting apparatus having the focal point detecting means capable of performing excellent focus detection by suitably arranging the rotation prism and the focal point detecting means in adjusting an in-plane angle of the projection image projected on the projection surface using the rotation prism and performing detection of focal point of the projection lens using the light beam passing through the rotation prism.

What is claimed is:

1. An image projecting apparatus comprising:

a projection lens;

a prism, disposed in an exit-side optical path of said projection lens, for rotating a projection image;

optical means for forming a first optical path for projecting an image through said projection lens and said prism to a first projection surface and a second optical path for projecting the image to a second projection surface;

focal point detecting means disposed in the second optical path, said detecting means comprising a light-receiving element disposed in the second optical path and an image-forming lens for forming a projection image on said light-receiving element; and rotating means for effecting a relative rotation between said prism and said focal point detecting means so as to make an exit-side optical axis of said prism coincident with an optical axis of said image-forming lens.

2. An image projecting apparatus according to claim 1, wherein said rotating means comprises position detecting means for detecting a rotational position of said prism, and wherein the relative rotation is effected between said prism and said focal point detecting means, based on a position detected by said position detecting means.

3. An image projecting apparatus according to claim 2, wherein said focal point detecting means rotates about an axis parallel to the optical axis of said image-forming lens.

4. An image projecting apparatus according to claim 1, wherein a screen is placed on the first projection surface.

5. An image projecting apparatus according to claim 1, wherein a recording medium is placed on the first projection surface.

6. An image projecting apparatus according to claim 1, wherein said optical means comprises optical path splitting means.

7. An image projecting apparatus according to claim 6, wherein said optical path splitting means is a half mirror.

8. An image projecting apparatus according to claim 1, wherein upon detecting a focal point the relative rotation is effected between said prism and said focal point detecting means, wherein said light-receiving element detects a focus state of said projection lens on the projection surface when the exit-side optical axis of said prism coincides with the optical axis of said image-forming lens, and said projection lens is controlled to an in-focus position, based on an output from said light-receiving element.

9. An image projecting apparatus according to claim 1, wherein said optical means comprises a half mirror and wherein said half mirror and said focal point detecting means can rotate in a united manner.

10. An image projecting apparatus according to claim 1, wherein said image-forming lens demagnifies the projection image to form a demagnified image on said light-receiving element.

11. An image projecting apparatus for projecting an image to a projection surface by a projection lens, comprising:

a prism disposed on an exit side of the projection lens so that an entrance-side optical axis and an exit-side optical axis of said prism for rotating the projection image deviate from each other;

a half mirror disposed on an exit side of said prism, for reflecting a part of an incident light beam thereto;

a focal point detecting unit disposed on a reflection side of said half mirror, for detecting a focus state of said projection lens on the projection surface; and means for effecting a relative rotation between said prism and said focal point detecting unit so that the exit-side optical axis of said prism is located at a predetermined position of said focal point detecting unit.

12. An image projecting apparatus according to claim 11, wherein said focal point detecting unit can rotate to a position corresponding to a rotation angle of said prism.

13. An image projecting apparatus according to claim 12, comprising an image-forming lens for focusing the projection image on said focal point detecting unit, wherein said means for effecting a relative rotation effects the relative rotation between said prism and said image-forming lens so as to make the exit-side optical axis of said prism coincide with an optical axis of said image-forming lens.

* * * * *